United States Patent [19]

Matsuzaki et al.

[11] 4,099,550

[45] Jul. 11, 1978

[54] APPARATUS FOR FILLING LIQUID CRYSTAL INTO THE CELLS OF LIQUID CRYSTAL DISPLAY DEVICES

[75] Inventors: Hideo Matsuzaki; Keiji Yajima, both of Mobara, Japan

[73] Assignee: Hitachi, Ltd., Tokyo, Japan

[21] Appl. No.: 722,011

[22] Filed: Sep. 10, 1976

[30] Foreign Application Priority Data

Nov. 12, 1975 [JP] Japan ................. 50-135055

[51] Int. Cl.² .......................................... B65B 31/02
[52] U.S. Cl. ................................. 141/51; 141/113; 141/115; 141/237; 141/392; 350/330
[58] Field of Search ................ 137/205; 141/1, 5, 7, 141/8, 31, 51, 59, 61, 67, 113, 324, 110, 115, 237, 275–278, 311 R, 392; 222/187; 350/160 LC

[56] References Cited

U.S. PATENT DOCUMENTS

| 1,922,458 | 8/1933 | Schaeffer ................. 141/31 X |
| 3,282,306 | 11/1966 | Greenhut ................. 141/31 X |
| 3,767,520 | 10/1973 | Dick et al. ................. 222/187 |

*Primary Examiner*—Richard E. Aegerter
*Assistant Examiner*—Frederick R. Schmidt
*Attorney, Agent, or Firm*—Charles E. Pfund

[57] ABSTRACT

A plurality of cells are mounted on a cell holder with their liquid crystal filling ports faced downwardly. A support is used having a longitudinal groove in the upper surface and a liquid crystal holding member in the form of helically wound coil or a bundle of inert fibers is placed in the groove. The support and cell holder are placed in a vacuum tank and the filling ports are contacted against the liquid crystal holding member to fill the liquid crystal into the cells while at the same time inert gas is admitted into the vacuum tank to assist filling.

6 Claims, 9 Drawing Figures

APPARATUS FOR FILLING LIQUID CRYSTAL INTO THE CELLS OF LIQUID CRYSTAL DISPLAY DEVICES

BACKGROUND OF THE INVENTION

This invention relates to apparatus for filling a liquid crystal into the cell of the display device.

Liquid crystal display devices are now used extensively as digital display elements for such electronic devices as table type electronic computers of the dynamic scattering mode, wrist watches utilizing field effect type display elements because of their small power consumption.

According to typical prior art methods of filing a liquid crystal into the cell, the liquid crystal is filled into the cell through a funnel, or a cell provided with a filling port is dipped in a body of the liquid crystal for filling the cell with the liquid crystal through the filling port. In any case, the filling port is sealed after filling the liquid crystal.

According to the former method, it is difficult to fit the funnel in the filling port because the thickness of the cell is extremely small. According to the latter method since the cell is dipped in the liquid crystal, when the cell is contaminated, the liquid crystal is also contaminated thereby greatly affecting the operating characteristics of the device. Moreover, both methods consume an excessive quantity of the liquid crystal, from ten to several times ten the quantity actually filled in the cell. Since the liquid crystal is expensive, this increases the cost of manufacturing.

SUMMARY OF THE INVENTION

It is an object of this invention to provide an improved apparatus for simultaneously filling a liquid crystal display device without contaminating the liquid crystal and without wasting the same.

According to this invention there is provided apparatus for filling a liquid crystal into a cell of a liquid crystal display device, the cell being provided with a liquid crystal filling port, the apparatus comprising a cell holder for supporting a plurality of cells in spaced parallel relationship, a support provided with at least one longitudinal groove in the surface thereof for accommodating the liquid crystal, liquid crystal holding means contained in the groove and including capillary passages for the liquid crystal, a vacuum tank for containing the cell holder mounted with the cells and the support with the liquid crystal holding means placed in the groove, and means for contacting the filling port of the respective cells against the liquid crystal holding means thereby filling the liquid crystal into the cells through the filling ports.

The liquid crystal holding means takes the form of a helically wound coil with the spacings between the turns acting as the capillary passages, or a bundle of fibers of a material inert to the liquid crystal. In another modification, the support comprises an arcurate member provided in its upper surface with a plurality of narrow parallel grooves adapted to contain the liquid crystal.

DESCRIPTION OF THE PREFERRED EMBODIMENTS

Figure 1:
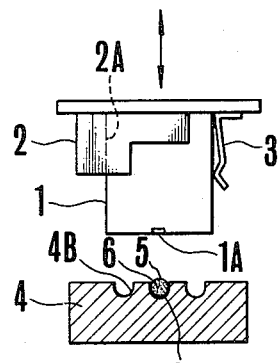
FIG. 1 is an end view, partly in section, of the liquid crystal filling apparatus of this invention.
Figure 2:
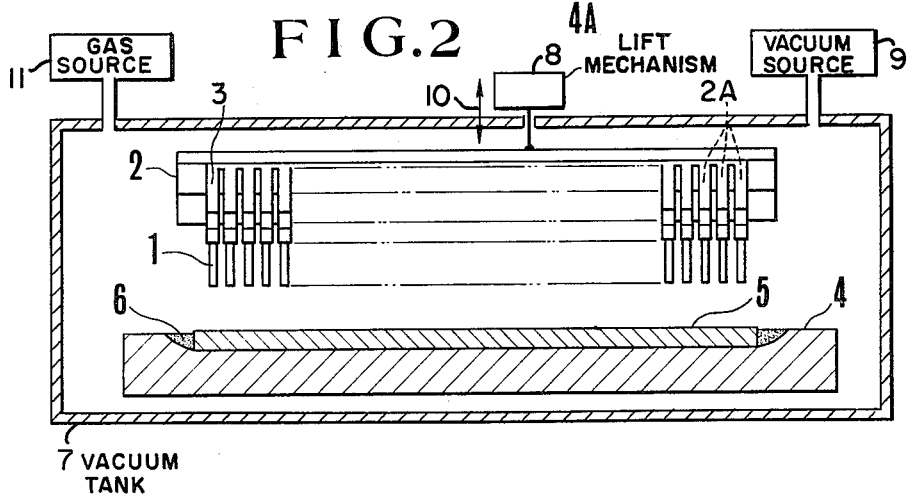
FIG. 2 is a side view, partly in section, of the liquid crystal filling apparatus shown in FIG. 1.
Figure 3:
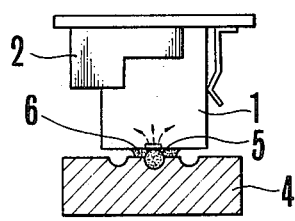
FIG. 3 is a view similar to FIG. 1 showing the manner of filling a liquid crystal.

In a first embodiment of this invention shown in FIGS. 1, 2 and 3, a liquid crystal display cell 1 comprises a pair of substrates which are assembled with a sealing member of about ten micron thickness, not shown, interposed therebetween. A liquid crystal filling port 1A extends through the bottom of the cell. Although not shown, electrodes in the form of a digit, letter or symbol are mounted on the opposing inner surfaces of the substrates as is well known in the art. A plurality of cells 1 are mounted on a cell holder 2 provided with equally spaced parallel grooves 2A for receiving the cells. The spacing between cells is made to be more than about 1 mm for the purpose of preventing rise of the liquid crystal between adjacent cells by capillary action. Resilient clips 3 are used to hold the cells 1 in the grooves 2A. A support or a liquid crystal holder 4 made of a material such as tetrafluoroethylene or glass not chemically reactive with the liquid crystal is used. A groove 4A for accommodating the liquid crystal 6 and a helical coil 5 made of a metal or alloy inert to the liquid crystal or a wire plated with such metal or alloys, and a pair of side grooves 4B for receiving overflown liquid crystal are formed in the upper surface of the liquid crystal holder 4. The purpose of the side grooves 4B is to reduce the amount of the liquid crystal which would otherwise wet the lower surface of the cells.

To fill the liquid crystal into the cells, the cells 1 are, on one hand, mounted to the cell holder 2 and the liquid crystal 6 and coil 5 are, on the other hand, put in the groove 4A of the liquid crystal holder 4. The assembly is placed in a vacuum tank 7. In this case, filling ports 1A are positioned immediately above the groove 4A so that when the cells 1A are lowered together with the cell holder 2 by means of a suitable mechanism 8, the filling ports 1A will contact the coil 5 containing the liquid crystal. After the assembly is placed in the vacuum tank, the interior thereof is evacuated by vacuum source 9 to remove gas in the cells and the liquid crystal. Then the cell holder 2 is lowered along direction arrow 10 to cause the filling ports 1A to contact against the coil 5. When contacted, the liquid crystal 6 forms thin films thereof about the filling ports by the surface tension as shown in FIG. 3. Then, a dry inert gas from source 11 is admitted into the vacuum tank to force the liquid crystal into the cells through the filling ports 1A. During this step, the liquid crystal rises between the turns of the coil by capillary action as shown by arrows shown in FIG. 3 whereby fresh liquid crystal is filled in the cells.

As has been pointed out hereinabove, the coil 5 should not chemically react with the liquid crystal 5. As one example a stiff wire made of stainless steel for example having a diameter of 0.88 mm and plated with gold was wound into a helical coil having an outer diameter of 3 mm and a pitch of 0.25 mm and the coil was used to fill the liquid crystal into the cells in the vacuum tank and obtained a good result.

Because of the fact that the quantity of the liquid crystal contained in the coil can be regulated by varying the outer diameter and the pitch of the coil, it is possible to determine the outer diameter and the pitch from the amount of the liquid crystal to be filled in the cells. When the upper end of the coil is projected slightly, for example about 0.5 mm above the upper surface of the liquid crystal holder 4, it is possible to more accurately contact the filling port 1A with the coil 5. There is no limit for the shape of the groove 4A provided for the liquid crystal holder 4. Thus, the shape of the groove may be of a V-shape, U-shape or rectangle but when a semicircular groove that conforms to the outer diameter of the coil is used, it is possible to minimize the consumption of the liquid crystal. Instead of filling the liquid crystal in the vacuum tank, it is possible to fill the liquid crystal under atmospheric pressure by forming a plurality of filling ports for each cell which undergo capillary action. However this method requires a longer time for filling the liquid crystal.

Figure 4:
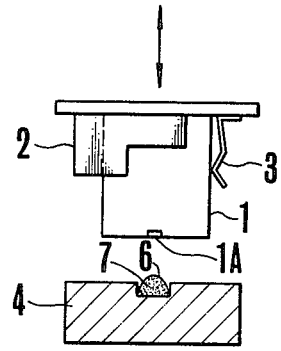
FIG. 4 is an end view, partly in section, showing a modified embodiment of this invention.
Figure 5:
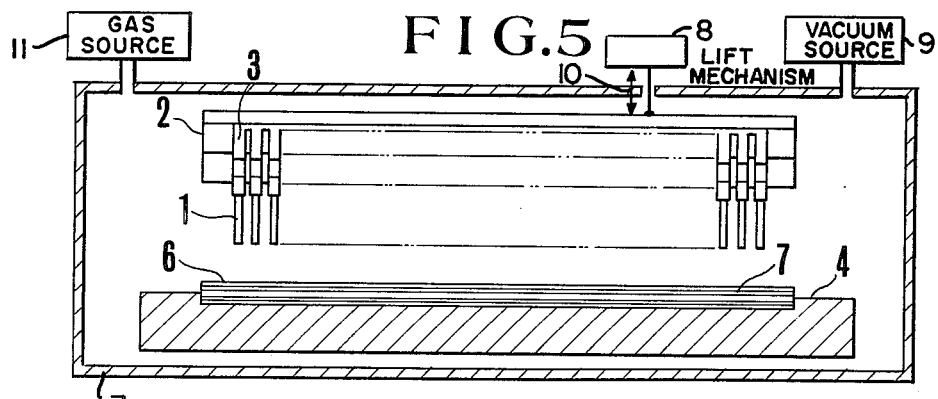
FIG. 5 is a side view, partly in section, of the modification shown in FIG. 4.
Figure 6:
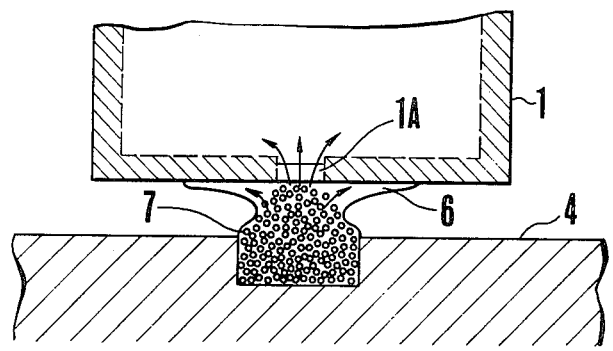
FIG. 6 is an enlarged end view showing the manner of filling a liquid crystal.

In the second embodiment of this invention shown in FIGS. 4, 5 and 6, a bundle of glass fibers 7 is placed in a groove formed in the upper surface of the liquid crystal holder 4. In this case too the liquid crystal rises through the interstices between the glass fibers by capillary action to enter into the cells. Instead of glass fibers, fibers of tetrafluoroethylene or other materials inert to the liquid crystal can also be used. It was found that fibers of glass or tetrafluoroethylene having a diameter of about 50 to 100 microns give satisfactory results. When knitted fibers are used, it is possible to eliminate the step of gathering the fibers into a bundle although there is a problem of cleansing the knitted fibers.

Figure 7:
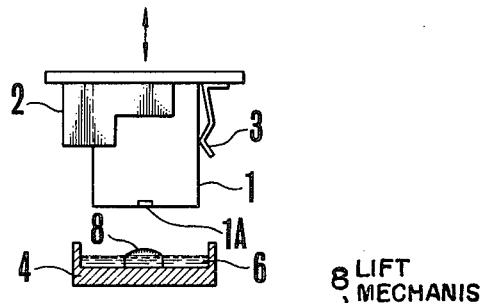
FIG. 7 is an end view, partly in section, of still another embodiment of this invention.
Figure 8:
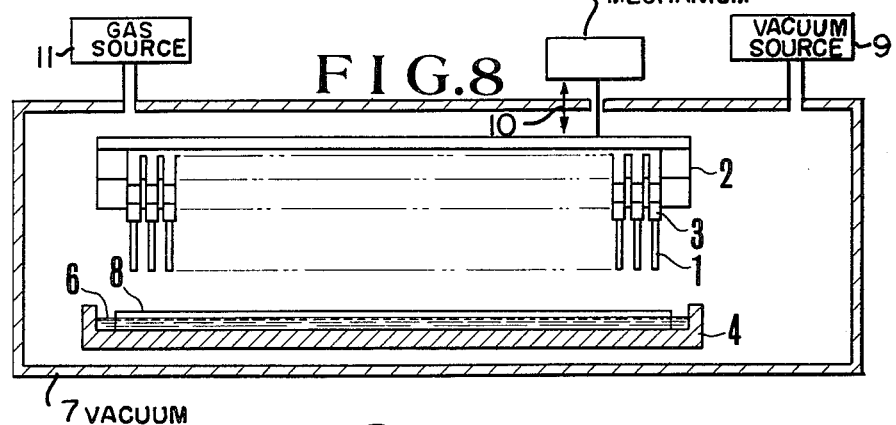
FIG. 8 is a side view, partly in section, of the modification shown in FIG. 7.
Figure 9:
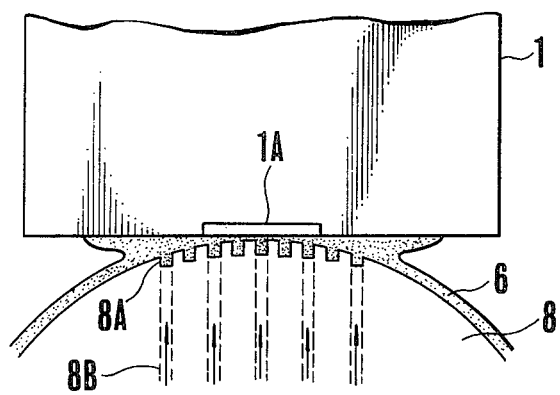
FIG. 9 is an enlarged end view of the modification shown in FIG. 8 showing the manner of filling a liquid crystal.

FIGS. 7, 8 and 9 show the third embodiment of this invention wherein an arcuate block made of a material inert to the liquid crystal such as glass for example is positioned in the liquid crystal holder 4 used. A plurality of longitudinal grooves 8A are provided for the upper surface of the block and passages 8B for supplying the liquid crystal to the grooves 8A are also formed. In the same manner as in the previous embodiments, when the filling ports 1A of the cells 1 are contacted against the block 8, the liquid crystal forms films thereof about the filling ports by surface tension and capillary action and the liquid crystal rising through the passages 8B enters into the cells.

As described hereinabove this invention provides apparatus for filling liquid crystal into a display cell including liquid crystal holding means made of a material inert to the liquid crystal and including capillary passages for the liquid crystal so that when the filling port is contacted against the liquid crystal holding means, the liquid crystal can readily be filled into the cell by capillary action. This action can be assisted by inert gas introduced in the vacuum tank. In consequence, it is possible to minimize the consumption and contamination of the liquid crystal.

What is claimed is:

1. Apparatus for filling a liquid crystal into a cell of a liquid crystal display device, said cell being provided with a liquid crystal filling port, said apparatus comprising a cell holder for supporting a plurality of cells in spaced parallel relationship, a support provided with at least one longitudinal groove in the surface thereof for accommodating said liquid crystal, liquid crystal holding means contained in said groove and including capillary passages for the liquid crystal which, due to the surface tension of said liquid crystal, are operatively and locally communicated with the liquid crystal filling port of respective cells by a thin film of liquid crystal about said filling port thus creating a minimized contact area between the liquid crystal and the cell, a vacuum tank containing said holder mounted with the cells and said support with said liquid crystal holding means, means for producing a vacuum in said tank, means for introducing inert gas into the vacuum tank, and means for contacting the filling port of the respective cells against said liquid crystal holding means, said contacting means supporting said cell holder in said vacuum tank in spaced relationship to the surface of the liquid crystal holding means when said vacuum tank is being evacuated and said cell filling port brought into contact with said liquid crystal holding means when the inert gas is being introduced, thereby filling said liquid crystal into the cells through said filling ports.

2. The apparatus according to claim 1 wherein said liquid crystal holding means comprises a helically wound coil, the spaces between adjacent turns therefor forming said capillary passages.

3. The apparatus according to claim 1 wherein said liquid crystal holding means comprises a bundle of fibers of a material inert to said liquid crystal.

4. The apparatus according to claim 1 wherein said liquid crystal holding means comprises knitted fibers of a material inert to said liquid crystal.

5. The apparatus according to claim 1 wherein said liquid crystal holding means comprises an arcuate member provided with a plurality of longitudinal parallel grooves filled with said liquid crystal, and a plurality of capillary passages connected to said grooves for supplying the liquid crystal from said liquid crystal support to said grooves by capillary action.

6. Apparatus for filling a liquid crystal into a cell of a liquid crystal display device, said cell being provided with a liquid crystal filling port, said apparatus comprising a cell holder for supporting a plurality of cells in spaced parallel relationship, a support provided with at least one longitudinal groove in the surface thereof for accommodating said liquid crystal, liquid crystal holding means contained in said groove and including capillary passages for the liquid crystal which, due to the surface tension of said liquid crystal, are operatively and locally communicated with the liquid crystal filling port of respective cells by a thin film of liquid crystal about said filling port thus creating a minimized contact area between the liquid crystal and the cell, a vacuum tank containing said holder mounted with the cells and said support with said liquid crystal holding means, means for producing a vacuum in said tank, means for introducing inert gas into the vacuum tank, and means for contacting the filling port of the respective cells against said liquid crystal holding means, said contacting means supporting said cell holder in said vacuum tank in spaced relationship to the surface of the liquid crystal holding means when said vacuum tank is being evacuated and said cell filling port brought into contact with said liquid crystal holding means when the inert gas is being introduced, thereby filling said liquid crystal into the cells through said filling ports, said liquid crystal holding means comprising a helically wound coil, the spaces between adjacent turns thereof forming said capillary passages, and wherein said support is provided with three parallel longitudinal grooves, said coil is contained in the central groove and the side grooves are used to receive the liquid crystal overflow from said central groove.

* * * * *